United States Patent [19]

Yeoman

[11] Patent Number: 4,800,925
[45] Date of Patent: Jan. 31, 1989

[54] AUTOMOBILE COOLANT FLOW CONTROL

[75] Inventor: Roger L. Yeoman, Dublin, Ohio

[73] Assignee: Ranco Incorporated of Delaware, Dublin, Ohio

[21] Appl. No.: 81,740

[22] Filed: Aug. 5, 1987

[51] Int. Cl.$^4$ ............................................. F16K 17/24
[52] U.S. Cl. ...................................... 138/46; 137/504;
137/517; 137/315; 138/43; 251/151; 285/321
[58] Field of Search ............... 137/504, 517, 515, 315;
251/148, 150, 151; 285/321, 921; 138/43, 45,
46; 237/12.3 A, 12.3 B; 165/31, 38, 40

[56] References Cited

U.S. PATENT DOCUMENTS

| | | |
|---|---|---|
| 590,892 | 9/1897 | Knight . |
| 780,986 | 1/1905 | Francis . |
| 2,297,736 | 10/1942 | Aymar . |
| 2,444,677 | 7/1948 | Rosenblum . |
| 2,593,315 | 4/1952 | Kraft . |
| 2,728,355 | 12/1955 | Dahl ............................ 138/45 |
| 2,948,296 | 8/1960 | Thorburn . |
| 3,050,086 | 8/1962 | Honsiger . |
| 3,138,177 | 6/1964 | Cutler . |
| 3,326,242 | 6/1967 | Parkison . |
| 3,474,831 | 10/1969 | Noakes ....................... 138/45 X |
| 3,718,350 | 2/1973 | Klein .......................... 285/921 X |
| 3,768,507 | 10/1973 | Dicker ......................... 137/504 |
| 3,966,119 | 6/1976 | Harter et al. ................. 165/38 X |
| 4,075,294 | 2/1978 | Saito et al. . |
| 4,195,777 | 4/1980 | Ikebukuro et al. . |
| 4,221,335 | 9/1980 | Shames et al. . |
| 4,244,526 | 1/1981 | Arth . |
| 4,262,844 | 4/1981 | Sekiya . |
| 4,369,922 | 1/1983 | Vikre . |
| 4,469,133 | 9/1984 | Boesing et al. .............. 137/625.29 |
| 4,583,769 | 4/1986 | Bortolin ....................... 285/921 X |

FOREIGN PATENT DOCUMENTS 56624 4/1985 Japan ................................. 165/40

OTHER PUBLICATIONS

Sample of a washer-like element available commercially from Vernay Laboratories.

Primary Examiner—Martin P. Schwadron
Assistant Examiner—Stephen M. Hepperle
Attorney, Agent, or Firm—Watts, Hoffmann, Fisher & Heinke

[57] ABSTRACT

A two-stage flow controller for use in a vehicle heating circuit including a housing defining an inlet and an outlet and a flow control chamber disposed between the inlet and outlet. A spring biased flow controller is disposed for sliding movement within the chamber towards and away from a valve seat. The flow controller includes an annular segment defining a through aperture and a plurality of axially extending legs which support the segment for sliding movement within the chamber and in predetermined alignment with the valve seat. Projections are defined on a face of the annular segment. When the fluid flow exceeds a predetermined level, the projections initially engage a valve seat surface such that a variable orifice is formed by clearance regions between a confronting face of the element and the seat. The element deforms to diminish the clearance space between the face and the seat as a function of fluid flow rate. In a preferred embodiment, the housing includes two portions that are snapped together and are maintained in their assembled positions by a resilient retaining ring. Locking lugs are supported beyond an end surface of one of the portions by a plurality of arcuate tabs which together define a segmented groove having a diameter larger than an end bore defined by the portion. The other portion is sized to fit within the end bore and includes a groove for receiving the retaining ring when compressed. When the second portion is inserted into the bore, the retaining ring expands outwardly into the segmented groove to maintain the engagement between the two portions.

9 Claims, 2 Drawing Sheets

AUTOMOBILE COOLANT FLOW CONTROL

Description

1. Technical Field

The present invention relates generally to fluid flow control devices and in particular, to a flow controller for use in a vehicle coolant circuit.

2. Background Art

Most automobiles and trucks in use today, operate with water-cooled power plants. Normally, a water-based fluid or coolant is circulated through the engine and absorbs heat therefrom. The heat is then discharged to the environment by a radiator. During cold weather operation, this waste engine heat is also used to heat the passenger compartment. This is achieved by passing the coolant through a supplementary heat exchanger normally termed a heater core. The heater core heats air flowing into, or circulating within, the passenger compartment, thus raising the overall temperature of the compartment.

In many if not most vehicles, the coolant is circulated by an engine driven pump. Since the engine speed varies during vehicle operation, the flow rate of coolant in the heater circuit changes as well. Because the heat output of a heat exchanger is determined primarily by the temperature and flow rate of coolant through the exchanger, the heat output of the heater core also varies with engine speed. The output of the heater with the engine idling and the vehicle at a standstill is substantially less than the output of the heater with the engine turning at a substantially higher RPM, i.e., when the vehicle is traveling at highway speeds.

It has also been found that the useful life of the heater core is substantially reduced if high coolant flow rates are allowed to proceed through the heater. The reason that the useful life is diminished at high flow rates is due to particles and other matter which are carried by the coolant. This matter may comprise normal residue left in the engine block coolant passages from the manufacturing process including sand left from the casting process and metal shavings left from the machining processes. These particles and other matter act as abrasives and abrade the inside of the passages in the heater core which are usually constructed of rather thin materials in order to promote heat exchange. At high fluid flow rates, this normal abrasion process can be greatly accelerated thus reducing the life of the heater.

As indicated above, high flow rates normally occur when the engine is turning at high RPM since the water pump is mechanically coupled to the engine. For this reason, many vehicle manufacturers place restrictions in the coolant lines feeding the heater to prevent or inhibit high fluid flow rates through the heater passages.

In the past, these restrictors operated satisfactorily to reduce the maximum flow rate of fluid through the heater at high engine speeds. However, these restrictors also restricted the flow at engine idle speeds. It has been found that in modern-day automobiles the amount of heat available in the coolant for heating the passenger compartment has been reduced. This reduction in heat availability is a result of using the coolant for other functions such as cooling turbochargers and other auxiliary equipment now forming part of modern automobiles. As a result, in vehicles that employ restricted coolant lines, insufficient heat is available for the heater when the engine is idling and unsatisfactory passenger compartment heating occurs on extremely cold days.

DISCLOSURE OF THE INVENTION

The present invention provides a new and improved flow control for the passenger compartment heating circuit which allows substantially unimpeded flow of coolant through the heater at low engine speeds and which operates to restrict the flow through the heater at high engine speeds. With the disclosed control, at low engine speeds i.e. engine idle, the amount of heat available from the engine coolant is not substantially reduced by flow restrictions in the coolant circuit.

In the preferred and illustrated embodiment, the flow control is disposed in a series with the passenger compartment heat exchanger or heater core and comprises a housing defining an inlet for receiving coolant, an outlet for discharging coolant and a flow controlling chamber disposed intermediate the inlet and outlet. A flow control member is slidably disposed in the flow control chamber and is responsive to the rate of flow of coolant through the chamber.

The flow controlling member is slidably movable between two positions. In one position, the flow control member is spaced from the seat and the fluid can flow through and around the flow control member. A spring biases the flow control member towards the first position. In a second position the flow control member engages a seat and at least partially restricts flow from the chamber into the outlet.

In the exemplary embodiment, the flow control chamber is preferably cylindrical and defines an annular seat that communicates with the outlet. The flow control member, which is slidably movable towards and away from the seat includes a somewhat annular segment defining a centrally located through hole that is substantially, axially aligned with the seat. The segment is supported for sliding movement towards and away from the seat by a plurality of guides that extend in the axial direction and which are preferably attached to a periphery of the segment at spaced locations. In the preferred and illustrated embodiment, the diameter of the annular segment is less than the diameter of the flow controlling chamber so that peripheral passages are defined between the wall of the chamber and the periphery of the segment. The guides are dimensioned such that the segment is maintained in a substantially centered position within the chamber. Each of the guides have a longitudinal extent which inhibits twisting of the segment within the chamber and, as a result, the through aperture defined by the segment remains substantially, axially aligned with the seat regardless of the position of the segment within the chamber. In the preferred and illustrated embodiment, the flow control member has a spider-like appearance with four longitudinal legs extending axially from a peripheral rim of the segment.

According to the invention, the flow controlling segment defines a face that is located in a confronting relationship with the seat. The face includes projections that extend axially from the face and which are aligned with the seat. In the preferred embodiment, the annular flow control segment is elastomeric in construction and may be made from rubber, plastic or other suitable material. When the member initially engages the seat, the projections define clearance regions between the seat and the flow control segment and allow fluid to travel between the confronting face defined by the flow control member and the seat. Fluid flow can also flow through the aperture defined by the member as well as through the peripheral flow passages defined between the rim of the segment and the inner wall of the chamber. As the flow rate of fluid increases, the fluid exerts a force on the member deforming it and causing at least portions of the confronting surface to engage the seat inhibiting or substantially reducing the extent of the clearance region thereby substantially diminishing the flow of fluid between the seat and the confronting face of the member. In short, the confronting face of the member, the projections and seat cooperate to function as a flow responsive variable orifice.

According to one preferred embodiment of the invention, the housing comprises a main body and a fitting assembly which snap together and are maintained in their assembled condition by a resilient locking member. In the preferred embodiment, the locking member is carried by the fitting assembly and engages structure defined by the main body which prevents the main body and a fitting from separating once the members are snapped together.

In accordance with this feature, the main body includes a plurality, preferably four, locking lugs which are supported a spaced distance beyond an end of the main body. The lugs are supported by axially extending support tabs. Each tab is arcuate in cross section and together define a segmented groove sized to receive a resilient retaining ring carried by the fitting assembly. The groove defines a diameter that is larger than a diameter defined by radial surfaces forming part of the lugs. The fitting assembly includes a groove for receiving the resilient retaining ring when it is compressed. To assemble the components, the ring is compressed into the groove formed in the fitting assembly. The end of the fitting assembly is pushed into an end bore defined by the main body and when in position, the retaining ring springs outwardly and engages the groove defined by the support tabs. Access openings are defined between the tabs which enable one to recompress the retaining ring in order to separate the main body from the fitting assembly.

The present invention provides an effective control for restricting high flow rates through a heater core. The disclosed construction is inexpensive to manufacture and the housing itself may be molded from a material such as glass-filled nylon. Very little if any machining is required.

According to another embodiment of the invention, the flow control member is an assembly of two pieces. One piece comprises a cage having a plurality of axially extending legs defining guides which slidably support the assembly within the controller chamber. The other piece comprises an elastomeric flow control element that is received and is captured within the cage. The flow control element performs a function of the flow control segment of the one-piece embodiment. In particular, the flow controlling element is annular and includes a face located in confronting relation with the valve seat. A plurality of projections extend axially from the face and are abuttable engageable with the seat when the flow control assembly moves to the first position. Fluid flow through and around the flow control element when the element initially engages the seat. As the flow increases, the flow controlling element deforms to partially or fully restrict the clearance defined between the confronting face and the valve seat. With this disclosed embodiment, the support cage is preferably constructed of a rigid material such as rigid plastic. The flow control element is deformed in order to insert the element into the cage and once installed is captured within the cage by spaced apart, parallel engaging support rings which engage the element. In this embodiment, the individual pieces that make up the flow control member can be individually replaced should one of them fail.

Additional features of the invention will become apparent and a fuller understanding obtained by reading the following detailed description made in connection with the accompanying drawings.

BEST MODE FOR CARRYING OUT THE INVENTION

Figure 1:
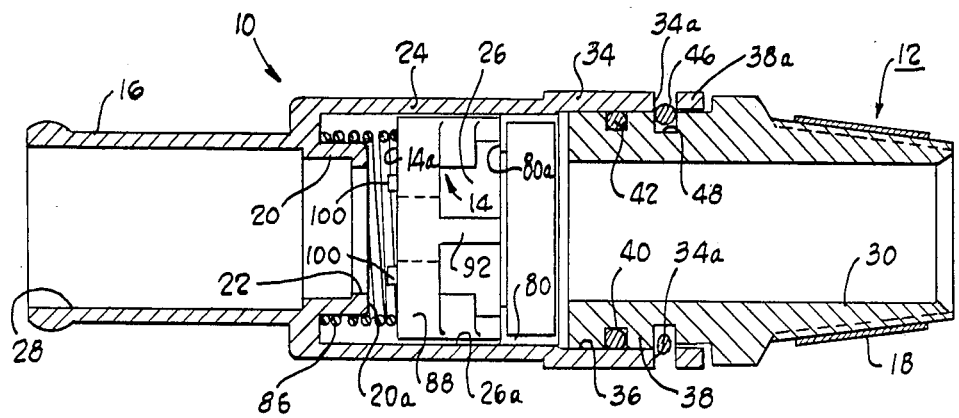
FIG. 1 is a sectional view of a flow controller constructed in accordance with one embodiment of the invention.

FIG. 1 illustrates the overall construction of a flow controller assembly constructed in accordance with one preferred embodiment of the invention. The flow controller is specifically adapted to control coolant flow to or from a passenger compartment heater (not shown) in a vehicle.

The flow controller includes a main body 10, a fitting assembly 12 and a flow control member 14. The main body 10 defines a fitting 16 to which a hose or other suitable conduit is fastened as by a clamp (not shown). The fitting assembly 12, in the illustrated embodiment, includes a tapered nose 18 which is adapted to engage or mate with structure forming part of a heater core or another heater control member (not shown). For example, the illustrated flow controller may be directly attached to either an input or output port of the passenger compartment heater core, or alternately, may be attached to or form part of a variable heater valve such as that shown in U.S. Pat. No. 4,469,133, which is owned by the present assignee and hereby incorporated by reference. The flow controller shown in FIG. 1 may also be an integral part of a variable heat control valve forming part of a passenger compartment heating circuit.

The main body 10 defines a seat 20 including an opening 22. An enlarged diameter segment 24 defines a flow controlling chamber 26 in which the flow control member 14 is movably supported. The opening 22 communicates with an outlet passage 28 defined by the fitting 16. Coolant enters the flow control assembly by way of an inlet passage 30 defined by the fitting assembly 12. The control member 14 moves towards and away from the valve seat 20 in response to a sensed pressure differential generated across the flow control element 14 by the coolant flowing from the passage 30 to the passage 28.

In accordance with this preferred embodiment, the fitting assembly 12 is removably attached to one end of the main body 10. The main body 10 includes an enlarged diameter end section 34 defining an end bore 36 that is adapted to receive a narrow diameter end section 38 formed on the left end (as viewed in FIG. 1) of the fitting 12. An O-ring 40 received in an O-ring groove 42 prevents or inhibits fluid leakage between the main body 10 and the fitting assembly 12.

In accordance with this preferred embodiment, the fitting assembly 12 is held to the main body 10 by a resilient retaining ring 46. The retaining ring 46 is receivable in a groove 48 formed in the fitting 12. The retaining ring 46 and associated groove 48 are sized so that when the ring is radially compressed, it can fit within the groove 48 so that no portion of the ring 46 will extend beyond an outer surface 38a of the fitting end section 38. The retaining ring 46, when in its free state, has a diameter that is larger than the diameter of the end section 38.

Figures 2, 3:
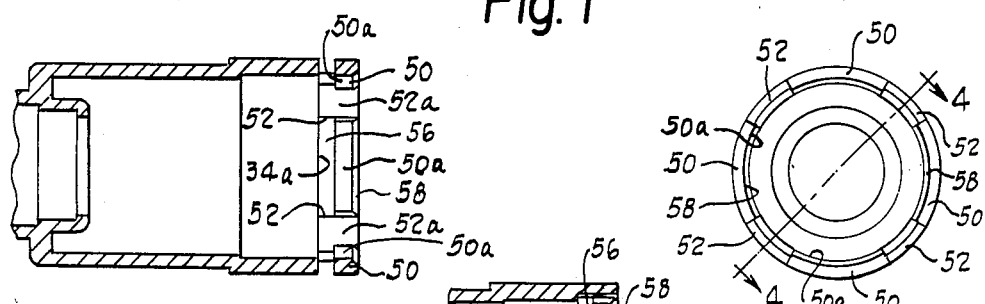
FIG. 2 is a fragmentary, sectional view of a main body forming part of the flow controller shown in FIG. 1.
FIG. 3 is an end view of the main body shown in FIG. 2.
Figure 4:
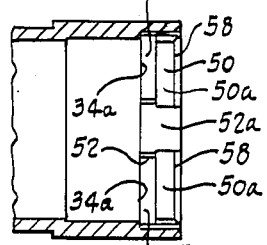
FIG. 4 is a fragmentary, sectional view of the main body as seen from a plane indicated by the line 4—4 in FIG. 3.

The main body 16 includes structure engageable by at least portions of the retaining ring 46 which prevent retraction or removal of the fitting 12 once the end section 38 is inserted into the end bore 36 defined by the body 10. In accordance with this feature and referring to FIGS. 2-4, the right end (as viewed in FIG. 1) of the main body 10 includes a locking structure engageable by the locking ring 46 carried by the fitting 12 which cooperate to maintain the body 10 and fitting 12 in their assembled positions shown, once the two members are snapped together. The structure comprises a plurality of arcuate locking lugs 50 and arcuate, axially extending support tabs 52.

In the illustrated embodiment, four locking lugs are defined. Each lug 50 is supported a space distance beyond partial end face segments 34a of the end section 34 by the axially extending support tabs 52. In the illustrated embodiment, the lugs 50 each define an internal axial surface 50a that conforms in dimension substantially to the bore surface 36. Each tab 52 has an inner axial surface 52a which together define a diameter that is larger than the diameter of the bore surface 36. In effect, the tabs 52 define a segmented groove which receives and confines the retaining ring 46 when the fitting 12 is installed. An opening 56 is defined between each lug 50 and the associated end surface segment 34a of the main body 10.

In the preferred embodiment, each lug defines a chamfered surface 58. The disclosed construction enables the fitting 12 to be readily inserted into the open end of the main body 10. The chamfered surfaces 58 of the lugs 50 urge the retaining ring 46 inwardly into the retaining ring groove 48. After the retaining ring 46 passes the lugs 50, it springs outwardly and engages the segmented groove defined by the four tabs 52. Once the retaining ring 46 expands outwardly, removal or disassembly of the fitting 12 from the main body 10 is substantially resisted. In effect, the fitting 12 is locked to the main body 10. In order to disassemble the fitting 12 from the main body 12, the retaining ring 46 must be compressed (via the openings 56).

Figure 5:
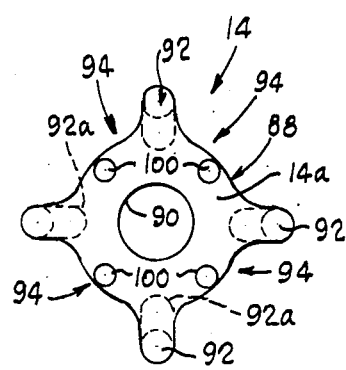
FIG. 5 is an end view of a flow control member forming part of the flow controller shown in FIG. 1.
Figure 6:
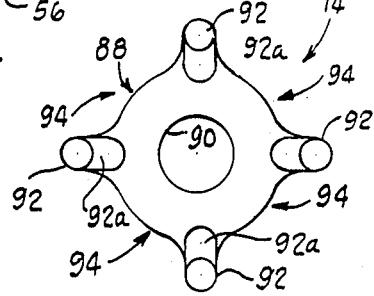
FIG. 6 is an opposite end view of the flow control member shown in FIG. 5.
Figure 7:
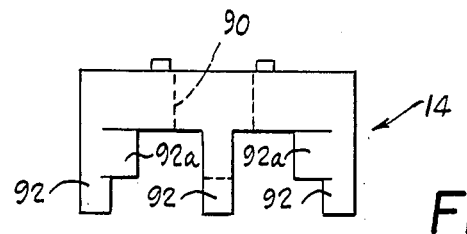
FIG. 7 is a side elevational view of the flow control member.

Turning now to FIGS. 5–7, the construction of one embodiment of the flow control member 14 will now be described. As indicated above, the member 14 is slidably mounted within the flow controlling chamber 26, primarily defined by the main body 16. The flow control member 14 moves towards and away from the valve seat 20 depending on the rate of fluid flow between the inlet passage 30 and the outlet passage 28. In the illustrated embodiment, the flow control member 14 is captured within the chamber 26 by an annular retaining member 80 which is press fitted into the chamber 26 after the flow control member 14 is installed. A spring 86 urges the flow control member 14 away from the seat 20 and into abutting engagement with the retainer 80. In the exemplary embodiment, the member 14 is made of an elastomeric material such as rubber or related compound.

The element 14 includes a somewhat annular portion 88 defining a central aperture 90. Four spider-like legs 92 extend axially from a periphery of the portion 88 and engage a rim 80a of the retainer 80. Thickened reinforcing sections 92a rigidize the legs 92. The diameter of the annular portion 88 is less than the diameter of the chamber 26 so that four flow passages, indicated generally by the reference character 94, are defined between the periphery of the portion 88, the legs 92 and an inner wall 26a of the chamber 26.

When the element 14 is in the position shown in FIG. 1, coolant travels from the passage 30 to the outlet passage 28 by way of the aperture 90 and the flow passages 94. As the fluid flow increases, the resulting pressure differential developed across the annular portion 88 generates a net force on the member 14 which opposes and counters the spring force exerted by the spring 86. When a predetermined flow rate across the member 14 is exceeded, the member 14 will shift leftwardly until the left side (as viewed in FIG. 1) of the member 14 engages a radial surface 20a defined by the valve seat 20.

In the preferred embodiment, a plurality of short stand-offs 100 are positioned on the left face 14a (as viewed in FIG. 1) of the member 14. The stand-offs 100 are positioned in a circle having a diameter that is substantially the diameter of the axial surface 20a defined by the seat 20. As a result, the stand-offs contact the axial surface 20a when the member 14 moves a predetermined distance to the left (as viewed in FIG. 1). With stand-offs 100 in contact with the seating surface 20a, coolant flow from the inlet passage 30 to the outlet passage 28 is restricted to the aperture 90 and small clearance spaces defined between the face 14a of the member 14 and the seating surface 20a.

As the coolant flow rate across the member 14 increases further, the additional force generated on the member 14 will cause it to deform (since it is elastomeric) and will cause at least portions of the left face 14a of the member 14 to contact the seating surface 20a thus gradually closing off the clearance regions provided by the stand-offs 100 between the seat surface 20a and the left face 14a. Eventually, if the pressure continues to increase, the clearance regions will be eliminated and substantially all coolant flow will proceed through the aperture 90. In effect, the face 14a, stand-offs 100 and seat surface 20a serve as a variable orifice.

With the disclosed construction, coolant flow through the flow controller is virtually unimpeded at low flow rates. As a result, maximum heat is available from the coolant when the vehicle engine is idling. As the flow rate increases with increasing engine speed, the flow control member 14 moves towards the left in order to restrict flow into the outlet passage 28. The stand-offs 100 inhibit an abrupt change in cooling flow that would otherwise occur when the flow control member 14 is suddenly seated on the valve seat surface 20a. In effect, the flow controller functions as a multistage restriction in which at least one of the stages it functions as a flow responsive variable restrictor.

The disclosed construction can be made virtually entirely of a plastic or other synethic material such as glass filled nylon. The use of such a material provides a flow control that is inexpensive to manufacture while being chemically inert to the materials and/or chemicals normally found in a vehicle coolant system. The flow control member 14 in this embodiment is a unitary structure, preferably molded from a soft elastomeric material. The legs 92 are integrally molded with the annular portion 88.

FIGS. 8-13 illustrate another embodiment of the invention. In the alternate embodiment, an inlet housing 112 is releasably connected to a mounting adapter 110. In the illustrated embodiment, the adapter 110 is fixed to the end of a tube 116. The tube 116, for example, may form part of the coolant circuit for the passenger heater (not shown). With this embodiment, the flow controller is mounted at a location remote from the actual heat exchanger, enhancing its serviceability and maintenance. In addition, existing heater constructions do not have to be modified to incorporate the flow controller. The controller can easily be attached to the end of an existing coolant conduit where it can be easily serviced or replaced should the need arise.

The mounting adapter 110 is fixedly secured to the end of the tube 116. If the adapter is metal, it can be brazed or welded to the end of the tube. If constructed of plastic a suitable adhesive would be used to effect the mounting. As in the embodiment shown in FIG. 1, the adapter includes a groove 48' for receiving the locking ring 46 during the assembly process. The mounting adapter 110 also includes an O-ring groove 42' and carries the sealing O-ring 40.

In this embodiment the mounting adapter 110 defines an integral valve seat 120. The inlet housing 112 defines an inlet nipple 113 which can be conveniently connected to a coolant hose (not shown). The inlet housing 112 slidably supports a flow control sub-assembly 114 and includes an enlarged diameter section 124 which at least partially defines a flow control chamber 126. A spring 125 biases the flow control sub-assembly 114 away from the seat 120.

Figures 12, 13:
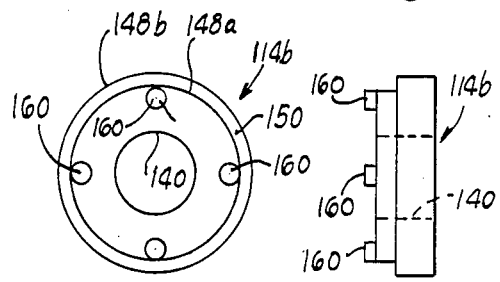
FIG. 12 is a side elevational view of a flow controller element forming part of the flow control member shown in FIG. 9.
FIG. 13 is a side elevational view of the flow controller element.

The flow control sub-assembly 114 in the alternate embodiment is of a two piece construction and includes a support cage 114a (shown best in FIGS. 9-11) an elastomeric flow control element 114b (shown best in FIGS. 12-13). The cage is similar in configuration to the flow control member 14 (shown in FIGS. 5-7). The cage includes four spaced apart spider-like legs 130 which are abuttably engageable with a shoulder 134 defined by the inlet housing 112. With the flow control sub-assembly 114 in the position shown in FIG. 8, coolant flows from the inlet nipple 113 to the tube 116 through a central aperture 140 defined by the flow controlling element 114b and between flow passages defined between the legs 132 and the inside of the chamber 126. These passages are indicated generally in FIG. 9 by the reference character 142. The legs 132 support coaxial, upper and lower rings 144, 146 as viewed in FIG. 11. In the illustrated embodiment, the upper ring 144 defines a larger diameter opening than the lower ring. As seen best in FIG. 8, the flow controlling element 114b has an outside diameter that is larger than the inside diameter of the upper ring 144. Since the element 114b is made of an elastomeric material it can be deformed or compressed in order to insert the element into the position between the upper and lower support rings 144, 146. Once inserted, the element 114b expands and is captured between the rings.

Figure 8:
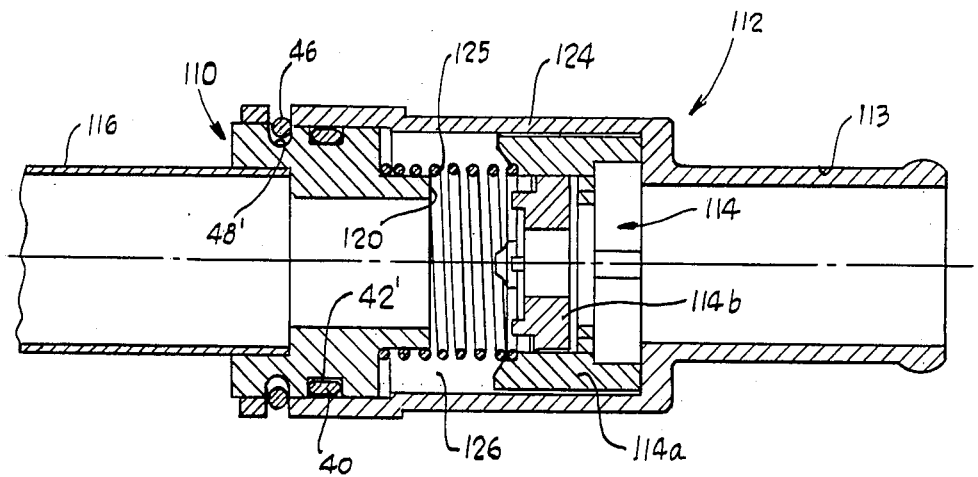
FIG. 8 is a sectional view of a flow controller constructed in accordance with another embodiment of the invention.
Figure 9:
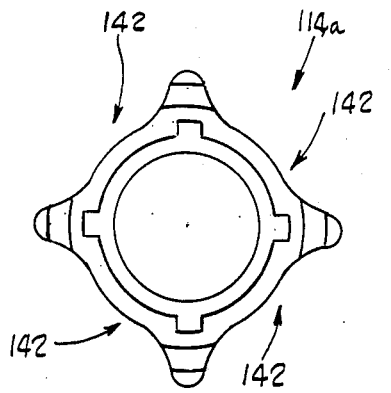
FIG. 9 is an end view of a cage forming part of a flow control member constructed in accordance with another preferred embodiment of the invention.
Figure 10:
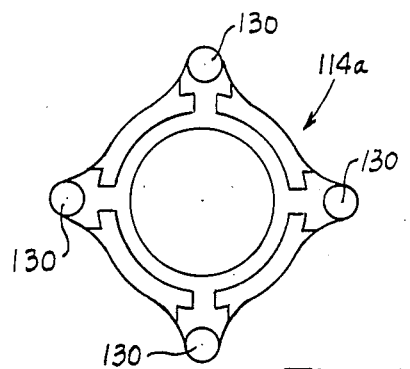
FIG. 10 is an opposite end view of the cage shown in FIG. 9.
Figure 11:
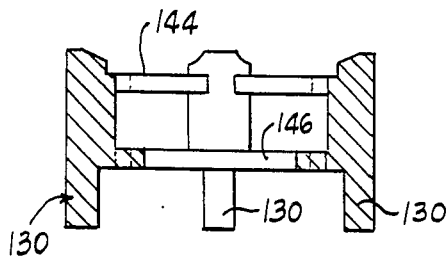
FIG. 11 is a sectional view of the cage.

The flow controlling element 114b includes a narrow diameter section 148a having a diameter slightly less than the diameter of the upper ring 144. As seen in FIG. 8, the narrow diameter section 148a just fits within the upper ring 144 when the element 114b is installed. A shoulder 150 defined between the narrow diameter section and an enlarged diameter section 148b fits within an inside surface of the upper ring 144. This construction ensures that the element 114b remains squarely positioned within the cage and prevents the element 114b from being released from the cage 114a. The element 114b also includes a plurality of standoffs 160 similar to the stand-offs 100 forming part of the member 14.

As seen in FIG. 8, the spacing between the support rings 144, 146 is slightly larger than the axial dimension of the larger diameter portion 148b of the flow controlling element 114b. As a result, an axial clearance is provided between the flow controlling element 114b and the support cage 114a which permits slight axial movement in the flow controlling element 114b to accommodate misalignments between the flow controlling element 114b and the seat 120. Preferably, and as shown in FIG. 8, a slight peripheral clearance is also provided between the flow controlling element 114b and the cage 114a so that the flow controlling element 114b can rotate and/or twist slightly within the cage.

The flow control assembly shown in FIG. 8 functions like the flow controller assembly shown in FIG. 1. As the flow rate of coolant from the inlet 113 to the outlet 116 increases, the resulting pressure differential across the flow control sub-assembly 114 increases, countering the biasing force exerted by the spring 125. When sufficient force is developed, the member 114 moves towards the left (as viewed in FIG. 8) until the standoffs 160 contact a radial valve seat surface 120a. With the member in this position, coolant can flow through the central aperture 140 and through a clearance space defined between the valve seat surface 120a and a left end face 162 defined by the flow controlling element 114. If the flow rate continues to increase, the flow controlling element deforms until at least portions of the end face 162 contact the seating surface 120a. When deformed, coolant can only flow through the central aperture 140.

In the alternate embodiment, the cage 114a is preferably constructed of a rigid synthetic material such as a suitable plastic whereas the flow controlling element 114b is constructed of an elastomeric material such as rubber. In its alternate embodiment, the sliding movement of the element 114 is borne solely by the rigid plastic cage 114a.

The alternate flow control assembly 114 may be used in the housing assembly shown in FIG. 1 (formed by the main body 10 and fitting assembly 14). The control assembly 114 may also be used in a housing that is attached to or forms an integral part of a variable heater valve such as that shown in U.S. Pat. No. 4,469,133.

Although the invention has been described with a certain degree of particularity it should be understood that those skilled in the art can make various changes to it without departing from the spirit or the scope of the invention as hereinafter claimed.

I claim:

1. A two-stage flow controller for use in a vehicle heating circuit, comprising:
    (a) a housing having an inlet and an outlet and a flow control chamber intermediate said inlet and outlet;
    (b) structure defining a valve seat within said chamber;
    (c) a flow controller assembly slidably disposed in said chamber for movement towards and away from said seat;
    (d) biasing means urging said flow controller assembly away from said seat;
    (e) said flow controlling assembly including:
        (i) a flow controlling element defining a valve seat engaging surface and a through passage, said element operative to restrict fluid flow through said passage as a function of fluid pressure;
        (ii) a cage for supporting said elastomeric element within said flow controlling chamber, said cage allowing relative axial movement between said flow controlling element and element engagement structure forming part of said cage;
        (iii) a plurality of peripheral axially extending legs slidably supporting said cage and operative to maintain a spaced distance between said flow controlling element and said inlet such that under conditions of reverse fluid flow said flow controlling element does not substantially impede fluid flow from said outlet to said inlet.

2. The apparatus of claim 1 wherein:
    (a) said housing includes at least two portions held together by a resilient retaining means;
    (b) one of said portions defining a bore open at one end, said one end of said one portion defining locking structure including a plurality of locking lugs supported a spaced distance from an end surface of said one end by a plurality of arcuate tabs;
    (c) said tabs together defining a segmented groove having a diameter larger than a diameter of said bore;
    (d) said lugs defining an inner axial surface substantially conforming to the diameter of said bore;
    (e) the other of said portions including an end piece defining an external groove for receiving said resilient retaining means, said end piece having a diameter sized to fit within said bore;
    (f) said resilient retaining means having a diameter in its free state that is larger than the diameter of said bore such that when said end piece is inserted into said bore, said resilient ring compresses into said groove of said end piece in order to clear said inner surfaces of said locking lugs but which expands outwardly into said segmented groove after passing said locking lugs so that said housing portions are coengaged.

3. The apparatus of claim 2 wherein said locking structure comprises four locking lugs.

4. The apparatus of claim 2 wherein said housing portions are constructed of a glass-filled synthetic material.

5. The apparatus of claim 1 wherein said cage removably supports said element.

6. The apparatus of claim 1 wherein said cage is constructed from a rigid, synthetic material.

7. A multi-stage flow controller for use in a vehicle heating circuit, comprising;
    (a) a housing having first and second fluid port means and a flow control chamber located intermediate said port means;
    (b) structure defining a valve seat within said chamber;
    (c) a flow controller assembly slidably disposed in said chamber for movement towards and away from said valve seat;
    (d) biasing means urging said flow controller assembly away from said seat;
    (e) said flow controller assembly including:
        (i) a flow controlling element defining a valve engaging surface engageable with said valve seat upon predetermined movement in said flow controller assembly, said element operative to restrict fluid flow from said first port means to said second port means as a function of fluid pressure exerted on said flow controlling element;
        (ii) a cage loosely supporting said flow controlling element within said flow controlling chamber, said cage allowing axial movement in said flow controlling element relative to said cage in order accommodate misalignments between said valve seat and said flow controlling assembly;
        (iii) guide means forming part of said cage for slidably supporting said cage within said flow control chamber and further operative to maintain a spaced distance between said flow controlling element and said first fluid port means such that under conditions of reverse fluid flow, said flow controlling element does not substantially impede fluid flow from said second port means to said first port means.

8. The apparatus of claim 7 wherein said guide means comprises a plurality of peripheral axially extending legs, said legs extending towards abutment structure forming part of said first port means.

9. The apparatus of claim 7 wherein said cage includes a pair of axial spaced support rings which capture said flow controlling element and inhibit the release of the element during both forward and reverse fluid flow.

* * * * *